United States Patent
Yao et al.

(10) Patent No.: US 12,238,763 B2
(45) Date of Patent: Feb. 25, 2025

(54) MSGA PUSCH VALIDATION

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Weidong Yang, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 17/440,022

(22) PCT Filed: Apr. 8, 2020

(86) PCT No.: PCT/CN2020/083830
§ 371 (c)(1),
(2) Date: Sep. 16, 2021

(87) PCT Pub. No.: WO2021/203330
PCT Pub. Date: Oct. 14, 2021

(65) Prior Publication Data
US 2022/0304045 A1    Sep. 22, 2022

(51) Int. Cl.
*H04W 74/00* (2009.01)
*H04W 72/0446* (2023.01)
(Continued)

(52) U.S. Cl.
CPC ..... *H04W 74/004* (2013.01); *H04W 72/0446* (2013.01); *H04W 72/23* (2023.01); *H04W 74/0836* (2024.01)

(58) Field of Classification Search
CPC .......... H04W 72/0446; H04W 74/004; H04W 74/006; H04W 74/0833; H04W 72/23;
(Continued)

(56) References Cited

U.S. PATENT DOCUMENTS

2020/0092777 A1  3/2020  Agiwal et al.
2020/0100297 A1  3/2020  Agiwal et al.
(Continued)

FOREIGN PATENT DOCUMENTS

CN    110536475    12/2019

OTHER PUBLICATIONS

Rastegardoost et al., "Validation Rule for Random Access Resources", USPTO provisional—U.S. Appl. No. 62/886,656 20190814, Total Pages: 150 (Year: 2019).*

(Continued)

*Primary Examiner* — Shah M Rahman
(74) *Attorney, Agent, or Firm* — Kilpatrick Townsend & Stockton LLP

(57) ABSTRACT

Embodiments are directed to providing MsgA PO validation. An embodiment of a user equipment (UE) user equipment (UE), comprising a processor to determine an initial uplink/downlink (UL/DL) slot configuration for communication with the UE, receive, from a base station, a cell-specific uplink/downlink configuration slot for communication with the UE, generate a MsgA physical uplink shared channel (PUSCH) occasion (PO), and implement a validation test to determine whether the MsgA PO is configured on at permissible slot in a transmission frame structure.

20 Claims, 9 Drawing Sheets

(51) Int. Cl.
*H04W 72/23* (2023.01)
*H04W 74/0836* (2024.01)

(58) Field of Classification Search
CPC ......... H04W 72/1268; H04W 74/0836; H04W 72/232; H04W 76/27
See application file for complete search history.

(56) References Cited

U.S. PATENT DOCUMENTS

| | | | |
|---|---|---|---|
| 2020/0107372 A1 | 4/2020 | Agiwal et al. | |
| 2020/0351947 A1* | 11/2020 | Lei | H04W 74/0833 |
| 2021/0045159 A1* | 2/2021 | Lei | H04W 72/23 |
| 2021/0051672 A1* | 2/2021 | Rastegardoost | H04W 74/006 |
| 2021/0243812 A1* | 8/2021 | Agiwal | H04W 74/008 |
| 2021/0250989 A1* | 8/2021 | Chin | H04W 72/535 |
| 2021/0251014 A1* | 8/2021 | Agiwal | H04L 5/0044 |
| 2021/0259021 A1* | 8/2021 | Huang | H04W 76/10 |
| 2022/0078856 A1* | 3/2022 | Jeon | H04L 1/1671 |
| 2022/0240326 A1* | 7/2022 | Rune | H04W 56/001 |
| 2022/0240327 A1* | 7/2022 | Ko | H04W 74/08 |
| 2022/0256619 A1* | 8/2022 | Xu | H04L 5/1469 |
| 2022/0264659 A1* | 8/2022 | Enbuske | H04W 74/0866 |
| 2022/0377813 A1* | 11/2022 | Wang | H04W 72/0453 |
| 2023/0015550 A1* | 1/2023 | Lin | H04B 1/7143 |
| 2023/0058331 A1* | 2/2023 | Takahashi | H04W 72/0446 |
| 2023/0094704 A1* | 3/2023 | Ohara | H04W 74/0833 370/329 |
| 2023/0127817 A1* | 4/2023 | Lee | H04W 64/00 370/329 |
| 2023/0328721 A1* | 10/2023 | Ohara | H04W 74/0833 |

OTHER PUBLICATIONS

Vivo, "Remaining issues on 2-step RACH procedure", 3GPP TSG RAN WG1 #100, R1-2000305, e-Meeting, Feb. 24-Mar. 6, 2020, Total Pages: 4 (Year: 2020).*
Ericsson, "Procedure for Two-step RACH", 3GPP TSG-RAN WG1 Meeting #99, R1-1912672, Reno, USA, Nov. 18-22, 2019, Total Pages: 13 (Year: 2019).*
Zte et al., "RAN1 agreements for Rel-16 2-step RACH", 3GPP TSG RAN WG1 #99, R1- 1913598, Reno, USA, Nov. 18- 22, 2019, Total Pages: 27 (Year: 2019).*
Discussion on Channel Structure for 2-Step RACH, 3GPP TSG RAN WG1 #99 R1-1912006, Nov. 22, 2019.
Discussion on Channel Structure for 2-Step RACH, Apple Inc., 3GPP TSG RAN WG1 #99 R1-1912803, Nov. 22, 2019.
International Patent Application No. PCT/CN2020/083830, International Search Report and Written Opinion, Mailed on Dec. 29, 2020, 10 pages.
3rd Generation Partnership Project; Technical Specification Group Radio Access Network; NR; Physical layer procedures for control (Release 16), 3GPP TS 38.213 V16.1.0, Mar. 2020, 157 pages.
Remaining Issues on Channel Structure for 2-step RACH, R1-2000304, 3GPP TSG RAN WG1 #100, 2020, 6 pages.
European Patent Application No. 20929837.1, Partial Supplementary European Search Report, Feb. 23, 2023, 16 pages.
European Patent Application No. 20929837.1, Extended European Search Report, May 30, 2023, 14 pages.
3GPP TS 38.213 V16.1.0, 3rd Generation Partnership Project; Technical Specification Group Radio Access Network; NR; Physical layer Procedures for Control (Release 16), Mar. 2020, 157 pages.
China Patent Application No. 202080099006.2, Office Action Oct. 14, 2024, 7 pages.

* cited by examiner

SEMI-STATIC UL/DL
CONFIGURATION

| DL SLOT(S) 310 | FLEXIBLE 315 | UL SLOT(S) 320 |
|---|---|---|

MsgA PUSCH CONFIGURATION | PO 325A | PO 325B | PO 325C |

FIG. 3

SEMI-STATIC UL/DL
CONFIGURATION

| DL SLOT(S) 310 | FLEXIBLE 315 | DL X 312 | UL SLOT(S) 320 |
|---|---|---|---|

MsgA PUSCH CONFIGURATION | PO 325A | PO 325B | PO 325C |

FIG. 4

SEMI-STATIC UL/DL
 CONFIGURATION

| DL SLOT 310 | FLEXIBLE 315 | FLEX UL 317 | UL SLOT 320 |
|---|---|---|---|

MSGA PUSCH CONFIGURATION  | PO 325A | PO 325B | PO 325C |

FIG. 8A

SEMI-STATIC UL/DL
 CONFIGURATION

| DL SLOT 310 | FLEXIBLE 315 | FLEX DL 318 | UL SLOT 320 |
|---|---|---|---|

MSGA PUSCH CONFIGURATION  | PO 325A | PO 325B | PO 325C |

FIG. 8B

SEMI-STATIC UL/DL
 CONFIGURATION

| DL SLOT 310 | FLEXIBLE 315 | UL SLOT 320 |
|---|---|---|

MSGA PUSCH CONFIGURATION | PO 325A | PO 325B | PO 325C |

FIG. 8C

MSGA PUSCH VALIDATION

CROSS-REFERENCE TO RELATED APPLICATIONS

This application is a 371 U.S. National Phase of PCT International Patent Application No. PCT/CN2020/083830, filed on Apr. 8, 2020; the disclosure of which is incorporated by reference herein in its entirety for all purposes.

FIELD

The present disclosure generally relates to the field of electronic communication, including aspects generally related to a method for MsgA PUSCH validation in communication networks.

BACKGROUND

In some radio network architectures, e.g., radio access technologies (RAT) that operate in accordance with fifth generation (5G) wireless network protocols, a user equipment (UE) utilizes a Random Access Channel (RACH) message to initiate a radio connection with a radio base station (BS), also commonly referred to as a evolved Node B (eNB) or a gigabit NodeB (gNB).

Some instantiations of radio access protocols utilized a four-step RACH procedure in which a UE first transmitted a physical random access channel (PRACH) preamble, commonly referred to as Msg1, to a BS. The BS responded by transmitting a random access response (RAR), commonly referred to as Msg2, to the UE which includes an uplink grant for a physical uplink shared channel (PUSCH). The UE transmitted a scheduled transmission, commonly referred to as Msg3, to the BS that includes a contention resolution identifier. In response, the base station transmitted a contention resolution message, commonly referred to as Msg4, to the base station.

This four step random access procedure requires two round trip cycles between the UE and the BS, which introduces latency and requires additional control-signaling overhead. To address these and other issues, efforts are being undertaken to replace the four-step random access procedure with a two step random access procedure.

BRIEF DESCRIPTION OF THE DRAWINGS

The detailed description is provided with reference to the accompanying figures. The use of the same reference numbers in different figures indicates similar or identical items.

FIG. 3 is a diagram illustrating a MsgA PUSCH configuration in accordance with various examples discussed herein.

FIG. 4 is a diagram illustrating a MsgA PUSCH configuration in accordance with various examples discussed herein.

FIGS. 8A, 8B and 8C are diagrams illustrating a MsgA PUSCH configuration in accordance with various examples discussed herein.

Figure 1A:
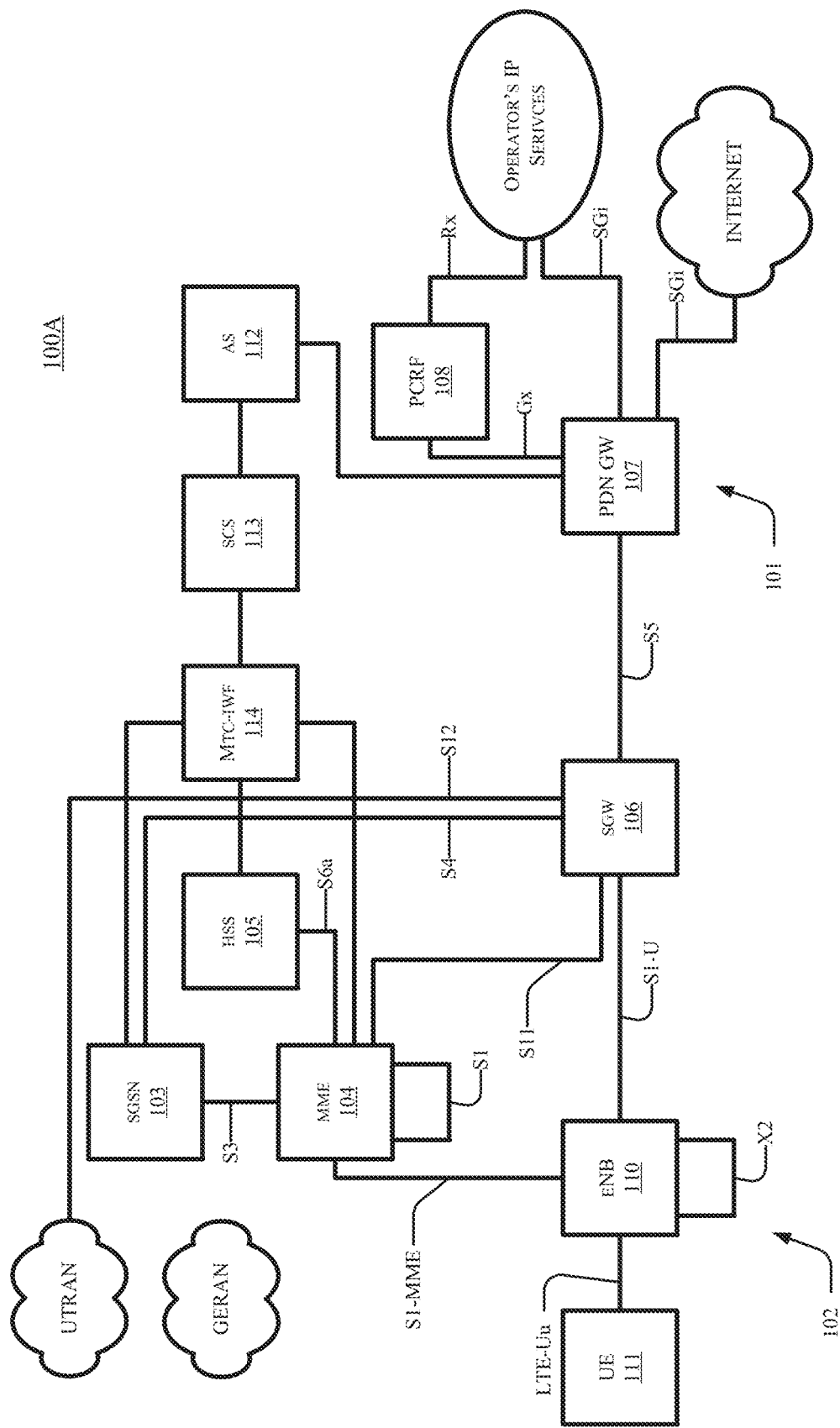
FIG. 1A is a schematic, block diagram illustration of components in a 3GPP LTE (e.g., 4G) network, which may be used to implement MsgA PUSCH validation in communication networks in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

As described in brief above, the four step random access procedure implemented in some networking protocols requires two round-trip cycles between the UE and the BS, which introduces latency and requires additional control-signaling overhead. To address these and other issues, efforts are being undertaken to replace the four-step random access procedure with a two-step random access procedure that is designed to reduce latency and control-signaling overhead, e.g., by having a single round trip cycle between the UE and the base station. This is achieved by combining the preamble and the scheduled PUSCH transmission (e.g., Msg1 and Msg3) into a single message, referred to as MsgA, from the UE, and by combining the random-access response and the contention resolution message (e.g., Msg2 and Msg4) into a single message, referred to as MsgB, from the BS to the UE.

In some examples, the MsgA includes the MsgA PRACH and associated MsgA PUSCH. Before the MsgA transmission, a UE may identify whether the MsgA PUSCH occasion (PO) and the MsgA PRACH occasion (RO) are valid. A MsgA PUSCH configuration is independently configured for the UE in the RRC_CONNECTED state and in the RRC_IDLE/INACTIVE state.

In some examples, a UE may validate the MsgA RO and PO before the MsgA is transmitted. In some existing implementations a rule may be applied pursuant to which a PUSCH occasion (PO) may be considered valid if it does not overlap in time and frequency with any PRACH occasion associated with either a Type-1 random access procedure (RACH) or a Type-2 random access procedure (RACH). Additionally, if a UE is provided with TDD-UL-DL-ConfigurationCommon, a PUSCH occasion (PO) may be considered valid if: (1) it is within uplink (UL) symbols, or (2) it does not precede a subcarrier spacing Physical Broadcast Channel (SS/PBCH) block in the PUSCH slot and starts at least a predetermined gap length (Ngap) symbols after a last downlink symbol and predetermined gap length (Ngap) symbols after a last SS/PBCH block symbol In some examples, a validation rule may be applied pursuant to which a PUSCH occasion is valid if it does not overlap in time and frequency with any PRACH occasion associated with either a Type-1 random access procedure or a Type-2 random access procedure. Additionally, if a UE is provided TDD-UL-DL-ConfigurationCommon, a PUSCH occasion is valid if: (1) it is within UL symbols, or (2) it does not precede a SS/PBCH block in the PUSCH slot and starts at least Ngap symbols after a last downlink symbol and at least Ngap symbols after a last SS/PBCH block symbol.

These validation rules allow a UE to transmit the PO on the flexible symbols and/or UL slot. Some new radio (NR) time division duplex (TDD) algorithms support dynamic TDD. More specifically the flexible symbols indicated by semi-static uplink/downlink (UL/DL) configuration can be configured as DL or UL by dynamic slot format indication (SFI) or downlink control information (DCI).

In some examples, the MsgA transmitted by the UE comprises a PRACH preamble, referred to as MsgA PRACH, and a PUSCH transmission, commonly referred to as a MsgA PUSCH. The MsgA PRACH preambles can be transmitted in one or more PRACH Occasions (ROs). The PUSCH transmissions are organized into PUSCH Occasions (POs) which may span multiple symbols and physical resource blocks (PRBs) with optional guard periods and guard bands between consecutive POs.

These validation rules for the MsgA PUSCH are not adequate if dynamic TDD is indicated. The flexible symbols used by MsgA PUSCH could change the transmission direction by UE-specific RRC signaling or DCI. A MsgA PUSCH configuration may be configured independently for a UE in RRC_CONNECTED state, and in RRC_IDLE/INACTIVE state. For an RRC_CONNECTED UE, the UE would require further action to determine whether the PO is still valid with dynamic TDD signaling. For an RRC_IDLE UE, the MsgA PUSCH is still transmitted on flexible symbols, but the base station (e.g., eNB, gNB) would transmit the DL signal at these symbols, which may cause interference between UEs, and the MsgA PUSCH may not be received by the base station.

To address these and other issues, described herein are various techniques to validate a MsgA PUSCH which may find utility in communication networks, particularly in situations in which the dynamic TDD is indicated for a UE. By way of overview, in a first example technique, the same PO validation rule may be applied to a UE in RRC_IDLE/INACTIVE state and UE in RRC_CONNECTED state. For a UE in RRC_IDLE/INACTIVE state, if the PO is not configured on a DL slot by semi-static UL/DL configuration, a UE may assume the configured POs are always valid. For a UE in RRC_CONNECTED state, the transmission direction of flexible symbols for MsgA PUSCH can't be reversed to DL by dynamic signaling. Thus, the UE would assume this is an error case. The UE doesn't receive the DL channel/signal in the slot overlapped with MsgA PUSCH symbols, and the symbols for MsgA PUSCH transmission can't be set as DL by slot format indication (SFI) DCI.

In a second example technique, the MsgA PUSCH is only allowed to be transmitted on an UL slot, not on the flexible symbols configured by semi-static UL/DL configuration. e.g., by the parameter TDD-UL-DL-ConfigurationCommon. The PO is considered invalid if it is configured to be transmitted on flexible symbols and/or a DL slot.

In a third example technique, the PO validation rules are defined separately for a UE in RRC_IDLE/INACTIVE state and a UE in RRC_CONNECTED state. For a UE in RRC_IDLE/INACTIVE state, the PUSCH occasion (PO) is only configured in the UL slot, otherwise the PO is invalid. For a UE in RRC_CONNECTED state, the PO can be configured on flexible symbols, if the flexible symbols are indicated as DL symbols, the related PO becomes invalid.

Further details of these techniques will be described with reference to the network architectures, devices, and method described below with reference to FIGS. 1-10. FIG. 1 is a schematic, block diagram illustration of components in a 3GPP NR (or 5G) network 100A, which may be used to implement MsgA PUSCH validation in communication networks in accordance with various examples discussed herein. FIG. 1 also generally shows exemplary network elements and exemplary standardized interfaces. At a high level, network 100A comprises a core network (CN) 101 (also referred to as an evolved Packet System (EPC)), and an air-interface access network, also referred to as an E-UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1, such as interfaces S3, S4, S5, etc., although not described herein.

While CN 101 includes many logical nodes, the E-UTRAN access network 102 is formed by at least one node, such as evolved NodeB (base station (BS), eNodeB (eNB) or a next-generation NodeB (gNB)) 110, which connects to one or more User Equipment (UE) 111, of which only one is depicted in FIG. 1. UE 111 may also be referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 104 by an S1 MME interface and to SGW 106 by an S1 U interface. The protocols that run between the eNBs and the UEs are generally referred to as the "AS protocols." Details of the various interfaces are well known and not described herein.

The eNB 110 hosts the Physical (PHY), Medium Access Control (MAC), Radio Link Control (RLC), and Packet Data Control Protocol (PDCP) layers, which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

In some examples, communication over a network such as network 100A may be digitized and assigned to discrete frames, each of which may contain subframes. Each subframe of the frame, in turn, may contain multiple slots. In some examples the eNB may schedule uplink and downlink transmissions over a variety of frequency bands. The allocation of resources in subframes used in one frequency band may differ from those in another frequency band. Each slot of the subframe may contain a predetermined number symbols, depending on the system used. In some embodiments, the subframe may contain 12 or 24 subcarriers.

A resource grid may be used for downlink and uplink transmissions between an eNB and a UE. The resource grid may be a time-frequency grid, which is the physical resource in each slot. The smallest time-frequency unit in a resource grid may be denoted as a resource element (RE).

Each column and each row of the resource grid may correspond to one OFDM symbol and one OFDM subcarrier, respectively. The resource grid may contain resource blocks (RBs) that describe the mapping of physical channels to resource elements and physical RBs (PRBs). In some networking protocols a PRB may be the smallest unit of resources that can be allocated to a UE. In some examples a resource block may be 180 kHz wide in frequency and 1 slot long in time. In frequency, resource blocks may be either 12×15 kHz subcarriers or 12×30 kHz subcarriers wide. For most channels and signals, 12 subcarriers may be used per resource block, depending on the system bandwidth. In some examples the duration of a resource grid in the time domain corresponds to one subframe or two resource blocks. For example, each resource grid may comprise 12 (subcarriers)*14 (symbols)=168 resource elements for normal cyclic prefix (CP) case. Several different physical channels may be conveyed using such resource blocks. In a 5G network, the sizes of the resource blocks, resource elements, and symbols, among others, may vary.

There may be several different physical downlink channels that are conveyed using such resource blocks, including the physical downlink control channel (PDCCH) and the physical downlink shared channel (PDSCH). Each subframe may contain a PDCCH, and the PDSCH. The PDCCH may normally occupy the first up to three symbols (four in the case of narrow bandwidths of 1.4 MHz) of each subframe and carry, among other things, information about the transport format and resource allocations related to the PDSCH channel and uplink scheduling grants for a physical uplink shared channel (PUSCH) transmission.

The PDSCH may carry user data and higher layer signaling to a particular UE and occupy the remainder of the downlink subframe to avoid the resources in which downlink control channels (PDCCH) are transmitted. Typically, downlink scheduling (assigning control and shared channel resource blocks to UEs within a cell) may be performed at the eNB based on channel quality information provided by the UEs, and then the downlink resource assignment information may be sent to a scheduled UE on the PDCCH used for (assigned to) PDSCH reception of the UE.

The PDCCH may contain downlink control information (DCI) in one of a number of formats that tell the UE where to find and how to decode the data, transmitted on PDSCH in the same subframe, from the resource grid. The DCI may provide details such as the number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the RNTI, which may be UE-specific, may limit decoding of the DCI information (and hence the corresponding PDSCH) to only the intended UE.

The PDCCH may be located in any of a number of frequency/temporal regions, depending on whether the PDCCH is UE-Specific or common, as well as the aggregation level. The set of possible candidate locations for the PDCCH is defined in terms of search spaces. A search space is defined by a set of Control Channel Element (CCE) candidates with a number of aggregation level L∈{1, 2, 4, 8} where the UE may monitor to find its PDCCHs. A common search space may carry DCIs that are common for all UEs; for example, system information (using the SI-RNTI), paging (P-RNTI), PRACH responses (RA-RNTI), or UL TPC commands (TPC-PUCCH/PUSCH-RNTI).

A UE-specific search space may carry DCIs for UE-specific allocations using a Cell Radio-Network Temporary Identifier (C-RNTI) assigned to the UE, a semi-persistent scheduling (SPS C-RNTI), or an initial allocation (temporary C-RNTI). When configuring an SPS (either uplink or downlink), the SPS C-RNTI is provided by the eNB and the UE is configured by higher layers to decode a PDCCH with a CRC scrambled by the SPS C-RNTI. The UE may monitor the PDCCH having a CRC scrambled by the SPS C-RNTI in every subframe as the eNB can activate/re-activate/release the SPS at any time using a DCI format with a CRC scrambled by an SPS C-RNTI. The received DCI format with a CRC scrambled by the SPS C-RNTI can be a grant/assignment for a retransmission or for activation/re-activation/release of the SPS.

In addition to the PDCCH, an enhanced PDCCH (EPDCCH) may be used by the eNB and UE. The PDSCH may thus contain data in some of the resource blocks (RBs) and then EPDCCH contains the downlink control signals in others of the RBs of the bandwidth supported by the UE. Different UEs may have different EPDCCH configurations. The sets of RBs corresponding to EPDCCH may be configured, for example, by higher layer signaling such as Radio Resource Control (RRC) signaling for EPDCCH monitoring.

The Physical Uplink Control Channel (PUCCH) may be used by the UE to send Uplink Control Information (UCI) to the eNB. The PUCCH may be mapped to an UL control channel resource defined by an orthogonal cover code and two resource blocks (RBs), consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate to the eNB an estimate of the current downlink channel conditions as seen by the UE to aid channel-dependent scheduling and, if one MIMO transmission mode is configured to the UE, may include MIMO-related feedback (e.g. Precoder matrix indication, PMI).

Figure 1B:
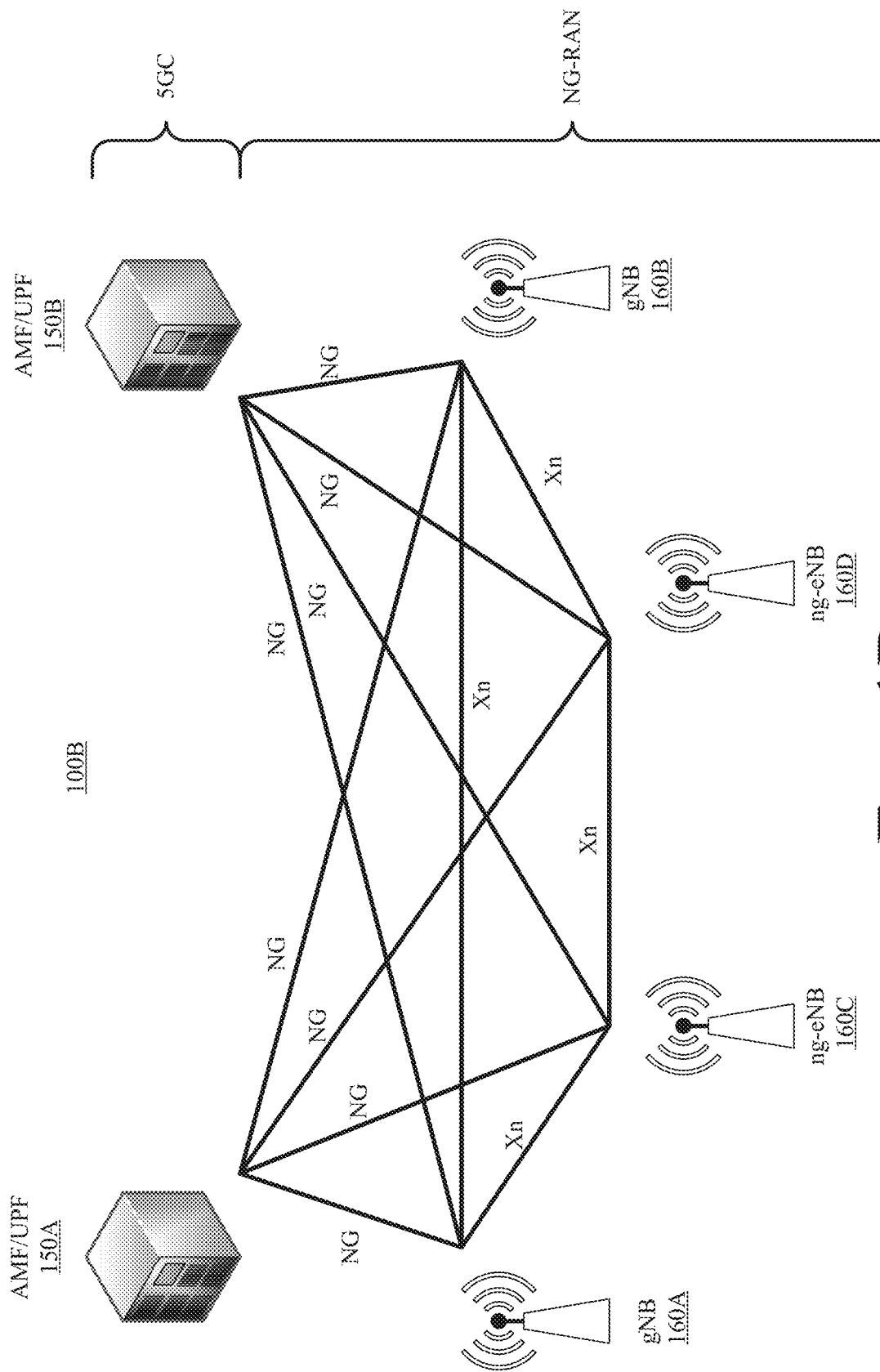
FIG. 1B is a schematic, block diagram illustration of components in a 3GPP NR (e.g., 5G) network, which may be used to implement MsgA PUSCH validation in communication networks in accordance with various examples discussed herein.

FIG. 1B is a schematic, block diagram illustration of components in a 3GPP NR network (e.g., 5G network), which may be used to implement MsgA PUSCH validation in communication networks in accordance with various examples discussed herein. Referring to FIG. 1B, in some examples network 100B comprises one or more Access and Mobility Management Function/User Plane Function (AMF/UMF) devices 150A, 150B, one or more gNBs 160A, 160B, and one or more ng-eNBs 160C, 160D. The AMF/UFP devices are communicatively coupled to the gNBs 160A, 160B and the gn-eNBs 160C, 160D, via NG interfaces. The gNBs 160A, 160B and the gn-eNBs 160C, 160D are communicatively coupled to one another via Xn interfaces.

Figure 2:
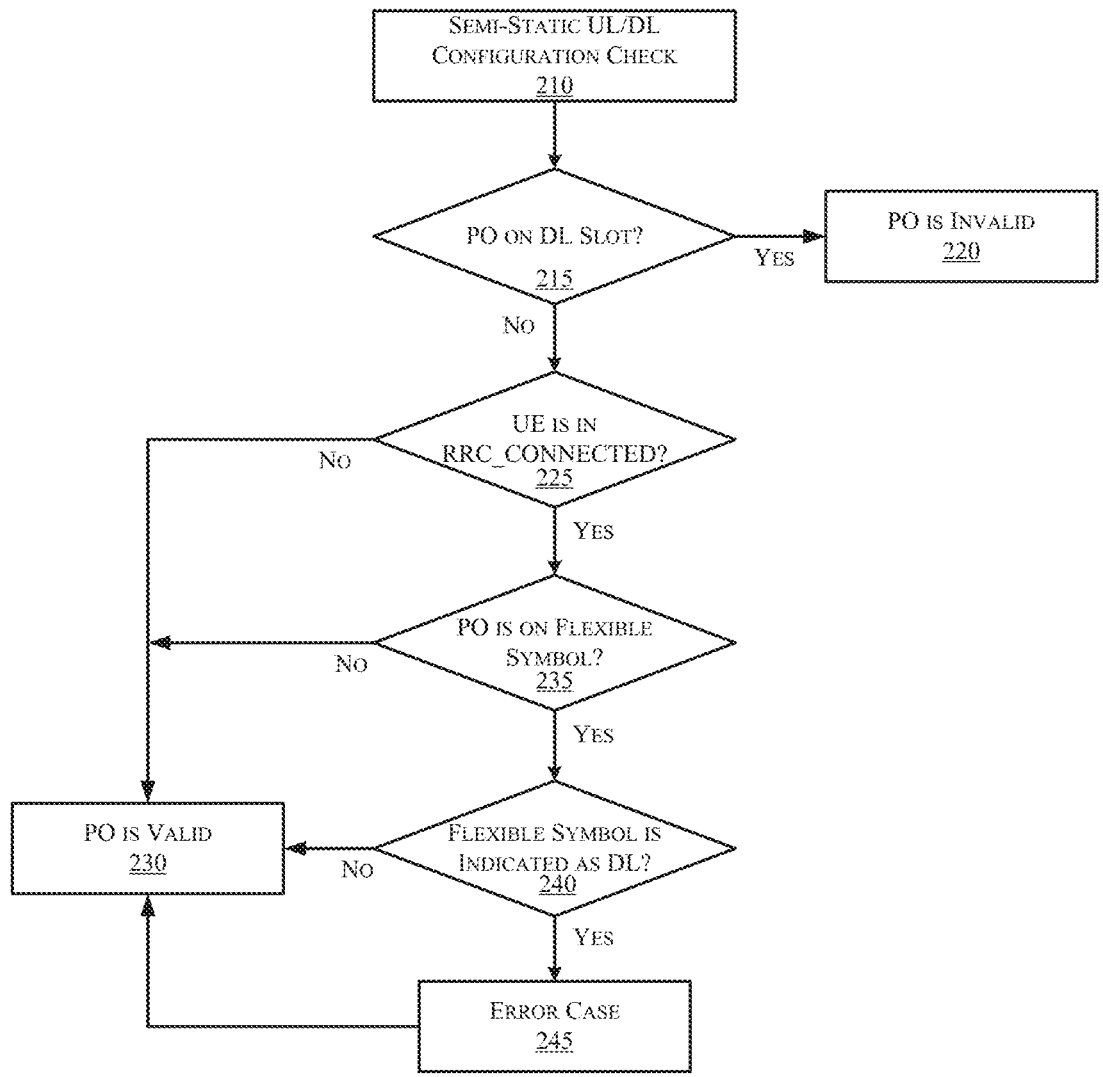
FIG. 2 is a flowchart illustrating operations in a method to implement MsgA PUSCH validation in a communication network in accordance with various examples discussed herein.

FIG. 2 is a flowchart illustrating operations in a method to implement MsgA PUSCH validation in a communication network in accordance with various examples discussed herein. The operations depicted in FIG. 2 may correspond to the first solution described above. In some examples the operations depicted in FIG. 2 may be implemented by a processing resource on a UE such as UE 111 depicted in FIG. 1.

Referring to FIG. 2, at operation 210 a UE first performs a semi-static UL/DL configuration check for a PUSCH occasion (PO). In some examples a valid PO is configured only on an UL slot and/or flexible symbols as indicated by semi-static UL/DL configuration, e.g., by the parameter TDD-UL-DL-ConfigurationCommon. Thus, at operation 215 it is determined whether the PO is configured on a downlink slot. If, at operation 215, the PO is configured on a downlink slot then control passes to operation 220 and the PO is determined to be invalid. By contrast, if at operation 215 the PO is not configured on a downlink slot then control passes to operation 225.

If the PO is not invalid, then the UE performs dynamic TDD checking for the PO. At operation 225 it is determined whether the UE is in the RRC_CONNECTED state. If, at operation 225, the UE is not in the RRC_CONNECTED state, implying that the UE is in the RRC_IDLE state, then control passes to operation 230 and the PO is considered to be valid. By contrast, if at operation 225 the UE is in the RRC_CONNECTED state then control passes to operation 235.

At operation 235 it is determined whether the PO has been assigned to a flexible symbol in the radio frame slot structure. If, at operation 235, the PO is not assigned to a flexible symbol (e.g., it is assigned to an UL symbol) then control passes to operation 230 and the PO is considered valid. By contrast, if at operation 235 the PO is assigned to a flexible symbol then control passes to operation 240.

At operation 240 it is determined whether the flexible symbol to which the PO is assigned is indicated as a DL symbol in the radio frame slot structure. If, at operation 240, the flexible symbol is not indicated as a DL symbol (e.g., it is an UL symbol) then control passes to operation 230 and the PO is considered valid. By contrast, if at operation 240 the flexible symbol is indicated as a DL symbol then control passes to operation 520 and the PO is considered an error case.

FIGS. 3-4 are diagram illustrating a MsgA PUSCH configuration in accordance with various examples discussed herein. Referring first to FIG. 3, in some examples a frame can be configured with one or more downlink slots 310, one or more flexible slots 315, and one or more uplink slots 320. In one example, one or more POs 325A, 325B, 325C can be configured on flexible symbol 315 and/or an UL slot 320, e.g., by semi-static UL/DL configuration. After dynamic TDD checking for the PO, the UE behavior is defined as follows: for a set of symbols of a slot corresponding to a valid PO and symbols before the valid PO, the resource grid may be configured such that the UE does not receive PDCCH, PDSCH, or CSI-RS in the slot if a reception would overlap with any symbol from the set of symbols.

Referring to FIG. 4, the resource grid may be configured such that the UE does not expect the set of symbols of the slot to be indicated as downlink by TDD-UL-DL-ConfigurationCommon or TDD-UL-DL-ConfigurationDedicated.

For a set of symbols of a slot corresponding to a valid PUSCH occasion and Ngap symbols before the valid PUSCH occasion, the UE does not expect to detect a DCI format 2_0 with an SFI-index field value indicating the set of symbols of the slot as downlink.

Figures 5, 6:
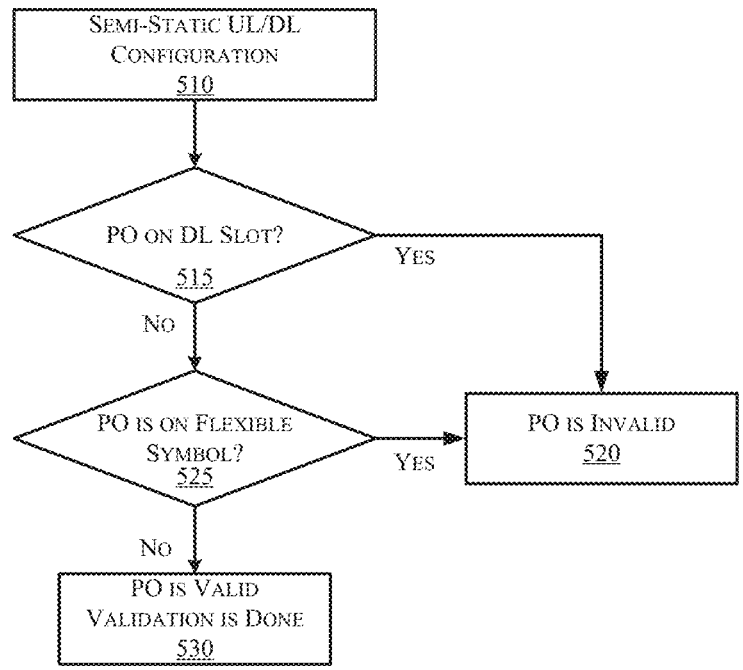
FIG. 5 is a flowchart illustrating operations in a method to implement MsgA PUSCH validation in a communication system in accordance with various examples discussed herein.
FIG. 6 is a diagram illustrating a MsgA PUSCH configuration in accordance with various examples discussed herein.

FIG. 5 is a flowchart illustrating operations in a method for MsgA PUSCH validation in a communication system in accordance with various examples discussed herein. In some implementations, the operations depicted in FIG. 5 may correspond to the second solution described above. In some examples the operations depicted in FIG. 5 may be implemented by a processing resource on a UE, such as UE 111 depicted in FIG. 1.

Referring to FIG. 5, at operation 510 a UE first performs a semi-static UL/DL configuration check for a PUSCH occasion (PO). In some examples a valid PO is configured only on an UL slot as indicated by semi-static UL/DL configuration, e.g., by the parameter TDD-UL-DL-ConfigurationCommon. Thus, at operation 515 it is determined whether the PO is configured on a downlink slot. If, at operation 515, the PO is configured on a downlink slot then control passes to operation 520 and the PO is determined to be invalid. By contrast, if at operation 515 the PO is not configured on a downlink slot then control passes to operation 525.

At operation 525 it is determined whether the PO has been assigned to a flexible symbol in the radio frame slot structure. If, at operation 525, the PO is not assigned to a flexible symbol (e.g., it is assigned to an UL symbol) then control passes to operation 530 and the PO is considered valid, and validation is finished. By contrast, if at operation 525 the PO is assigned to a flexible symbol then control passes to operation 520 and the PO is considered invalid.

FIG. 6 is a diagram illustrating a MsgA PUSCH configuration in accordance with various examples discussed herein. Referring to FIG. 6, a PO resource 325C is configured only on an UL slot 320 by semi-static UL/DL configuration. The POs 325A, 325B that are configured on flexible symbols 315 are considered invalid POs. Referring to FIG. 6, in some examples a UE only performs semi-static UL/DL configuration checking for PO. The flexible symbols can indicate as UL or DL according gNB scheduling for other user usage.

Figure 7:
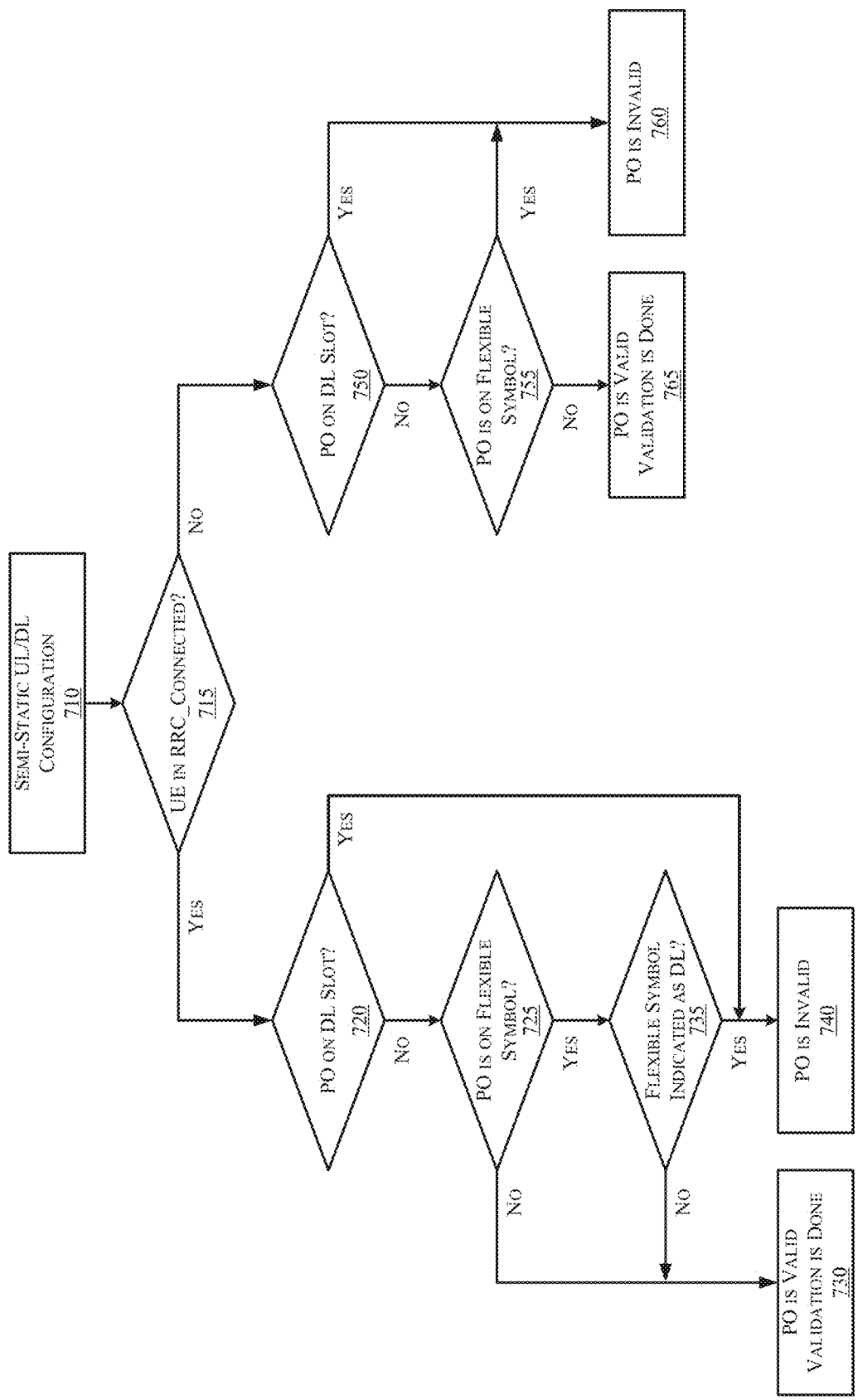
FIG. 7 is a flowchart illustrating operations in a method to implement MsgA PUSCH validation in a communication system in accordance with various examples discussed herein

FIG. 7 is a flowchart illustrating operations in a method for MsgA PUSCH validation in a communication system in accordance with various examples discussed herein. In some implementations, the operations depicted in FIG. 7 may correspond to the third solution described above. In some examples the operations depicted in FIG. 7 may be implemented by a processing resource on a UE, such as UE 111 depicted in FIG. 1.

Referring to FIG. 7, at operation 710 a UE first performs a semi-static UL/DL configuration check for a PUSCH occasion (PO). In some examples, the PUSCH resource for a UE in the RRC_IDLE/INACTIVE state is configured only on the UL slot by semi-static UL/DL configuration. Thus, a PO resource that is configured on flexible symbols and/or DL slot is invalid.

At operation 715 it is determined whether the UE is in the RRC_CONNECTED state. If, at operation 715, the UE is in the RRC_CONNECTED state, then control passes to operation 720. By contrast, if at operation 715 the UE is not in the RRC_CONNECTED state then control passes to operation 750.

At operation 720 it is determined whether the PO is configured on a downlink slot. If, at operation 720, the PO is configured on a downlink slot then control passes to operation 740 and the PO is determined to be invalid. By contrast, if at operation 720 the PO is not configured on a downlink slot then control passes to operation 725.

At operation 725 it is determined whether the PO has been assigned to a flexible symbol in the radio frame slot structure. If, at operation 725, the PO is not assigned to a flexible symbol (e.g., it is assigned to an UL symbol) then control passes to operation 730 and the PO is considered valid. By contrast, if at operation 725 the PO is assigned to a flexible symbol then control passes to operation 735.

At operation 735 it is determined whether the flexible symbol to which the PO is assigned is indicated as a DL symbol in the radio frame slot structure. If, at operation 735, the flexible symbol is not indicated as a DL symbol (e.g., it is an UL symbol) then control passes to operation 730 and the PO is considered valid. By contrast, it at operation 735 the flexible symbol is indicated as a DL symbol then control passes to operation 740 and the PO is considered invalid.

Referring back to operation 715, if at operation 715 the UE is not in the RRC_CONNECTED state then control passes to operation 750. At operation 750 it is determined whether the PO is configured on a downlink slot. If, at operation 750, the PO is configured on a downlink slot then control passes to operation 760 and the PO is determined to be invalid. By contrast, if at operation 750 the PO is not configured on a downlink slot then control passes to operation 755.

At operation 755 it is determined whether the PO has been assigned to a flexible symbol in the radio frame slot structure. If, at operation 755, the PO is not assigned to a flexible symbol (e.g., it is assigned to an UL symbol) then control passes to operation 760 and the PO is considered valid. By contrast, if at operation 755 the PO is assigned to a flexible symbol then control passes to operation 765 and the PO is considered valid and validation is done.

FIGS. 8A, 8B, and 8C are diagrams illustrating a MsgA PUSCH configuration in accordance with various examples discussed herein. Referring first to FIG. 8A, if the MsgA PUSCH resource configured for RRC_CONNECTED UE, POs 325A, 325B are valid because the POs are configured on flexible UL symbol 317 on the flexible slot 315 and PO 325C is valid because it is configured on an UL slot 320 by the semi-static UL/DL configuration signaling. Thus, the POs 325A, 325B, and 325C are all valid. Referring to FIG. 8B, the valid PO 325A could become invalid with the dynamic signaling indication if one of the flexible slots 315 is configured as a flexible DL slot 318. More specifically, the flexible symbols 315 can indicate as UL or DL according gNB scheduling, and the UE would verify the PO again according to the dynamic TDD signaling. If the flexible symbol is indicated as a flexible DL 318, the corresponding PO becomes invalid.

Referring to FIG. 8C, in some examples if a PUSCH resource for a UE in RRC_IDLE/INACTIVE UE is configured only on the UL slot 320 by semi-static UL/DL configuration. Thus, the POs 325A, 325B, 315C as depicted in FIG. 8C are valid. By contrast, a PO configured on either the DL slot 310 or the flexible slot 315 would be invalid.

Figure 9:
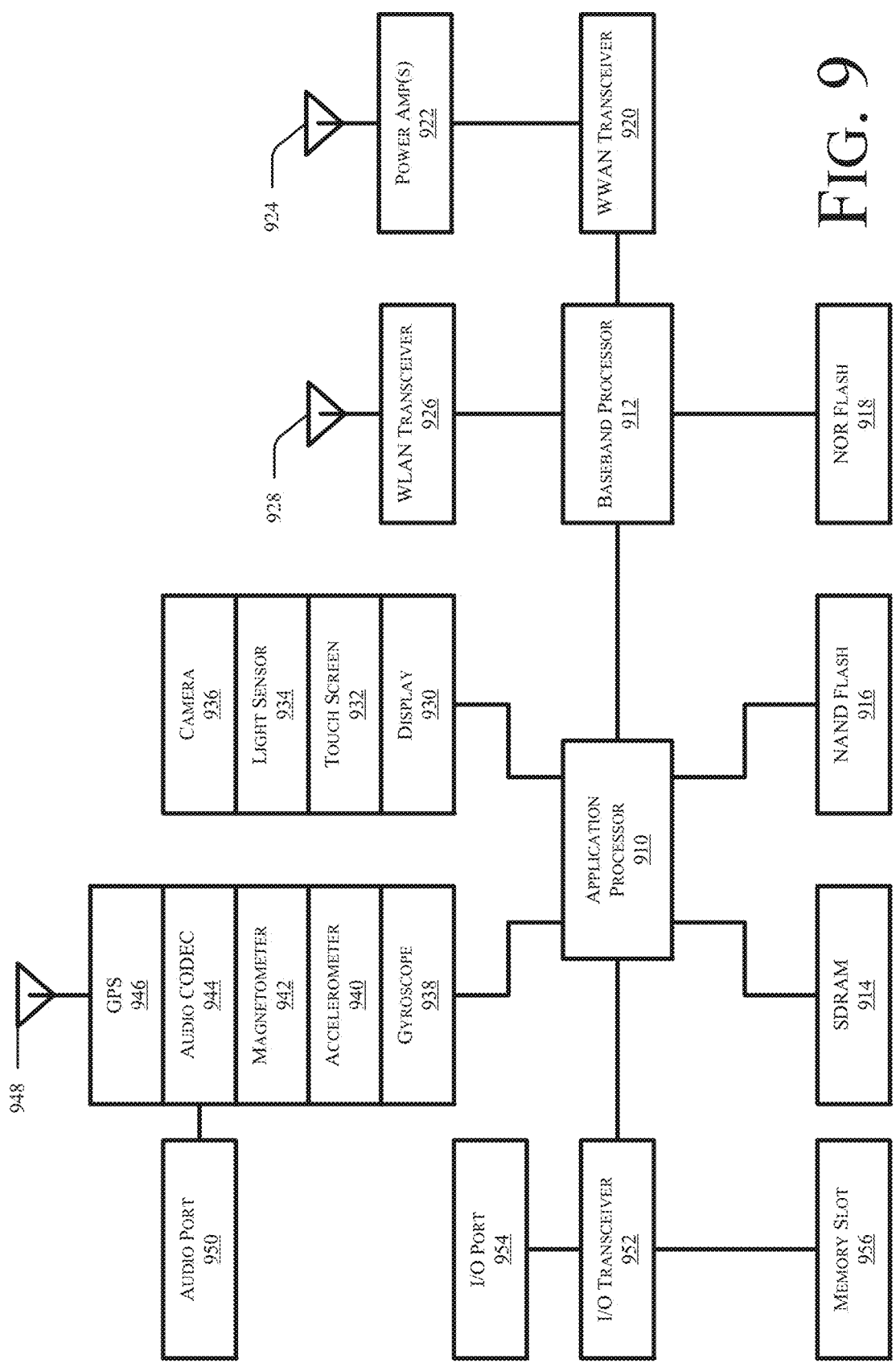
FIG. 9 is a schematic, block diagram illustration of an information handling system in accordance with exemplary embodiments disclosed herein.

FIG. 9 depicts an exemplary functional block diagram of an information-handling system 900 according to embodiments. Information handling system 900 of FIG. 9 may tangibly embody one or more of any of the exemplary devices, exemplary network elements and/or functional entities of the network as shown in and described herein. In one example, information-handling system 900 may represent eNB 110, and/or UE 111, with greater or fewer components depending on the hardware specifications of the particular device or network element. In another example, information-handling system may provide M2M-type device capability. Although information-handling system 900 represents one example of several types of computing platforms, information-handling system 900 may include more or fewer elements and/or different arrangements of elements than shown in FIG. 11, and the scope of the claimed subject matter is not limited in these respects.

In one or more examples, information-handling system 900 may comprise applications circuitry 910 and a baseband processor 912. Application circuitry 910 may be utilized as a general purpose processor to run applications and the various subsystems for information handling system 900, and to capable of providing an uplink-transmit-power control technique that reduces interference experienced at other wireless devices according to the subject matter disclosed herein. Application circuitry 910 may include a single core or alternatively may include multiple processing cores wherein one or more of the cores may comprise a digital signal processor or digital signal processing core. Furthermore, application circuitry 910 may include a graphics processor or coprocessor disposed on the same chip, or alternatively a graphics processor coupled to application circuitry 910 may comprise a separate, discrete graphics chip. Application circuitry 910 may include on-board memory, such as cache memory, and further may be coupled to external memory devices such as synchronous dynamic random access memory (SDRAM) 914 for storing and/or executing applications, such as capable of providing an uplink-transmit-power control technique that reduces interference experienced at other wireless devices according to the subject matter disclosed herein. During operation, and NAND flash 916 for storing applications and/or data even when information handling system 900 is powered off.

In one example, a list of candidate nodes may be stored in SDRAM 914 and/or NAND flash 916. Further, application circuitry 910 may execute computer-readable instructions stored in SDRAM 914 and/or NAND flash 916 that result in an uplink-transmit-power control technique that reduces interference experienced at other wireless devices according to the subject matter disclosed herein.

In one example, baseband processor 912 may control the broadband radio functions for information-handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example, for communicating via a 3GPP NR network or the like as discussed herein with respect to FIG. 1. The WWAN transceiver 920 couples to one or more power amplifiers 922 that are respectively coupled to one or more antennas 924 for sending and receiving radio-frequency signals via the WWAN broadband network. The baseband processor 912 also may control a wireless local area network (WLAN) transceiver 926 coupled to one or more suitable antennas 928 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP NR) based wireless network standard, a 3GPP2 Air Interface Evolution (3GPP2 AIE) based wireless network standard, a 3GPP-NR-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for application circuitry 910 and baseband processor 912, and the scope of the claimed subject matter is not limited in these respects. For example, any one or more of SDRAM 914, NAND flash 916 and/or NOR flash 918 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, application circuitry 910 may drive a display 930 for displaying various information or data, and may further receive touch input from a user via a touch screen 932, for example, via a finger or a stylus. In one exemplary embodiment, screen 932 display a menu and/or options to a user that are selectable via a finger and/or a stylus for entering information into information-handling system 900.

An ambient light sensor 934 may be utilized to detect an amount of ambient light in which information-handling system 900 is operating, for example, to control a brightness or contrast value for display 930 as a function of the intensity of ambient light detected by ambient light sensor 934. One or more cameras 936 may be utilized to capture images that are processed by application circuitry 910 and/or at least temporarily stored in NAND flash 916. Furthermore, application circuitry may be coupled to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information-handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information-handling system via the audio ports 950, for example, via a headphone and microphone jack. In addition, application circuitry 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory, such as secure digital (SD) card or a subscriber identity module (SIM) card, although the scope of the claimed subject matter is not limited in these respects.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
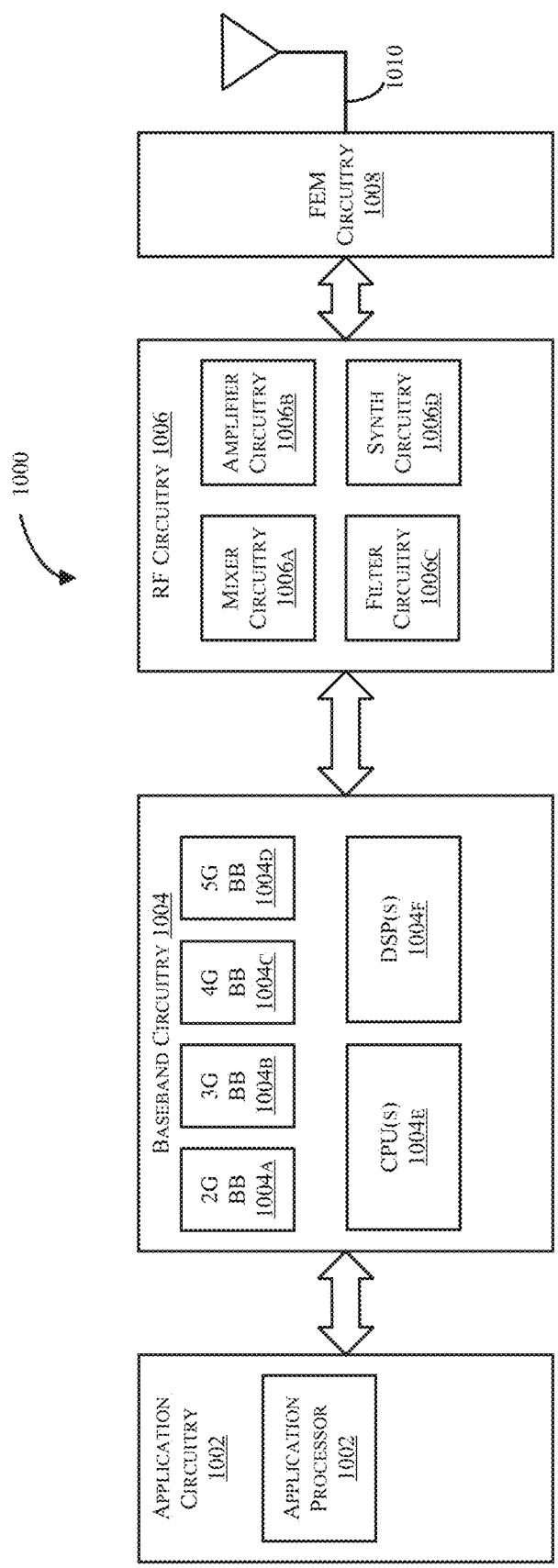
FIG. 10 is a schematic, block diagram illustration of components of a representative UE in accordance with one or more exemplary embodiments disclosed herein.

Embodiments described herein may be implemented into a system using any suitably configured hardware and/or software. FIG. 10 illustrates, for one embodiment, example components of a User Equipment (UE) device 1000. In some embodiments, the UE device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include application circuitry. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or a fifth generation (5G) baseband processor 1004d. It will be appreciated that baseband circuitry 1004 may comprise one or more additional baseband processors for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the application circuitry 1002 depending on the desired output frequency. In some embodiments, a divider control input (e.g., N) may be determined from a look-up table based on a channel indicated by the application circuitry 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE device 1000 may include additional elements such as, for example, memory/storage, display, camera, sensor, and/or input/output (I/O) interface.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. One or more non-transitory, computer-readable media having instructions that, when executed, cause a processor to:
   determine an uplink/downlink (UL/DL) slot configuration for communication with a base station;
   determine a MsgA physical uplink shared channel (PUSCH) occasion (PO) is associated with a flexible symbol based at least on the UL/DL slot configuration;
   identify a first PO validation rule associated with a radio resource control (RRC) connected state, wherein the first PO validation rule is to indicate that MsgA POs on flexible symbols that are not indicated for DL are valid;
   identify a second PO validation rule associated with an RRC idle/inactive state, wherein the second PO validation rule is to indicate that all MsgA POs on flexible symbols are not valid;
   select, as a validation rule, the first PO validation rule or the second PO validation rule based at least on whether the processor is associated with the RRC connected state or the RRC idle/inactive state; and
   determine whether the MsgA PO is valid based at least on the validation rule.

2. The one or more non-transitory, computer-readable media of claim 1, wherein the instructions, when executed, further cause the processor to:
   implement one of a predetermined number of UL/DL slot configuration patterns.

3. The one or more non-transitory, computer-readable media of claim 1, wherein the instructions, when executed, further cause the processor to:
   implement a flexible UL/DL configuration based at least on a stored set of UL/DL configuration patterns.

4. The one or more non-transitory, computer-readable media of claim 1, wherein the instructions, when executed, further cause the processor to:
   select the first PO validation rule as the validation rule based at least on the processor being associated with the RRC connected state;
   determine the MsgA PO is valid based at least on the validation rule; and
   generate a MsgA for transmission on the MsgA PO based at least on determination the MsgA PO is valid.

5. The one or more non-transitory, computer-readable media of claim 1, wherein the instructions, when executed, further cause the processor to:
   select the second PO validation rule as the validation rule based at least on the processor being associated with the RRC idle/inactive state;
   determine the MsgA PO is invalid based at least on the validation rule; and
   discard the MsgA PO based at least on determination the MsgA PO is invalid.

6. The one or more non-transitory, computer-readable media of claim 1, wherein the instructions, when executed, further cause the processor to:
   configure a resource grid to prevent reception on a DL channel in a slot that overlaps with one or more MsgA PUSCH symbols; and
   configure a resource grid to prevent detecting a downlink control information (DCI) indicating a set of symbols used by the MsgA PUSCH as a downlink.

7. The one or more non-transitory, computer-readable media of claim 6, wherein the instructions, when executed, further cause the processor to:
   discard the MsgA PO when the processor is associated with an RRC connected state and the flexible symbol is configured as a downlink slot.

8. The one or more non-transitory, computer-readable media of claim 1, wherein the instructions, when executed, further cause the processor to:
   select the first PO validation rule as the validation rule based at least on the processor being associated with the RRC connected state;
   determine whether the flexible symbol is indicated for DL by a dynamic slot format indication or downlink control information;
   determine, based on the validation rule, that the MsgA PO is valid if it is determined that the flexible symbol is not indicated for DL; and
   determine, based on the validation rule, that the MsgA PO is not valid if it determined that the flexible symbol is indicated for DL.

9. A computer-implemented method, comprising:
   determining an uplink/downlink (UL/DL) slot configuration for communication with a base station;
   determining a MsgA physical uplink shared channel (PUSCH) occasion (PO) is associated with a flexible symbol based at least on the UL/DL slot configuration;
   identifying a first PO validation rule associated with a radio resource control (RRC) connected state, wherein the first PO validation rule is to indicate that MsgA POs on flexible symbols that are not indicated for DL are valid;
   identifying a second PO validation rule associated with an RRC idle/inactive state, wherein the second PO validation rule is to indicate that all MsgA POs on flexible symbols are not valid;
   selecting, as a validation rule, the first PO validation rule or the second PO validation rule based at least on whether a user equipment (UE) is in the RRC connected state or the RRC idle/inactive state; and
   determining whether the MsgA PO is valid based at least on the validation rule.

10. The method of claim 9, further comprising:
    implementing one of a predetermined number of UL/DL slot configuration patterns.

11. The method of claim 9, further comprising:
    implementing a flexible UL/DL configuration based at least on a stored set of UL/DL configuration patterns.

12. The method of claim 9, further comprising:
    selecting the first PO validation rule as the validation rule based at least on the UE being in the RRC connected state;
    determining the MsgA PO is valid based at least on the validation rule; and
    generating a MsgA for transmission on the MsgA PO based at least on determination the MsgA PO is valid.

13. The method of claim 9, further comprising:
    selecting the second PO validation rule as the validation rule based at least on the UE being in the RRC idle/inactive state;
    determining the MsgA PO is invalid based at least on the validation rule; and
    discarding the MsgA PO based at least on determination the MsgA PO is invalid.

14. The method of claim 9, further comprising:
selecting the first PO validation rule as the validation rule based at least on the UE being in the RRC connected state;
determining whether the flexible symbol is indicated for DL by a dynamic slot format indication or downlink control information;
determining, based on the validation rule, that the MsgA PO is valid if it is determined that the flexible symbol is not indicated for DL; and
determining, based on the validation rule, that the MsgA PO is not valid if it determined that the flexible symbol is indicated for DL.

15. A device comprising:
memory to store a first PO validation rule associated with a radio resource control (RRC) connected state and a second PO validation rule associated with an RRC idle/inactive state, wherein the first PO validation rule is to indicate that MsgA POs on flexible symbols that are not indicated for DL are valid and the second PO validation rule is to indicate that all MsgA POs on flexible symbols are not valid; and
processing circuitry, coupled with the memory, the processing circuitry to
determine an uplink/downlink (UL/DL) slot configuration for communication with a base station;
determine a MsgA physical uplink shared channel (PUSCH) occasion (PO) is associated with a flexible symbol based at least on the UL/DL slot configuration;
select, as a validation rule, the first PO validation rule or the second PO validation rule based at least on whether a user equipment (UE) is in the RRC connected state or the RRC idle/inactive state; and
determine whether the MsgA PO is valid based at least on the validation rule.

16. The device of claim 15, wherein the processing circuitry is further to:
implement one of a predetermined number of UL/DL slot configuration patterns.

17. The device of claim 15, wherein the processing circuitry is further to:
implement a flexible UL/DL configuration based at least on a stored set of UL/DL configuration patterns.

18. The device of claim 15, wherein the processing circuitry is further to:
select the first PO validation rule as the validation rule based at least on the UE being in the RRC connected state;
determine the MsgA PO is valid based at least on the validation rule; and
generate a MsgA for transmission on the MsgA PO based at least on determination the MsgA PO is valid.

19. The device of claim 15, wherein the processing circuitry is further to:
select the second PO validation rule as the validation rule based at least on the UE being in the RRC idle/inactive state;
determine the MsgA PO is invalid based at least on the validation rule; and
discard the MsgA PO based at least on determination the MsgA PO is invalid.

20. The device of claim 15, wherein the processing circuitry is further to:
select the first PO validation rule as the validation rule based at least on the UE being in the RRC connected state;
determine whether the flexible symbol is indicated for DL by a dynamic slot format indication or downlink control information;
determine, based on the validation rule, that the MsgA PO is valid if it is determined that the flexible symbol is not indicated for DL; and
determine, based on the validation rule, that the MsgA PO is not valid if it determined that the flexible symbol is indicated for DL.

* * * * *